(No Model.)
W. H. McWHIRTER.
ANIMAL TRAP.
No. 596,334. Patented Dec. 28, 1897.
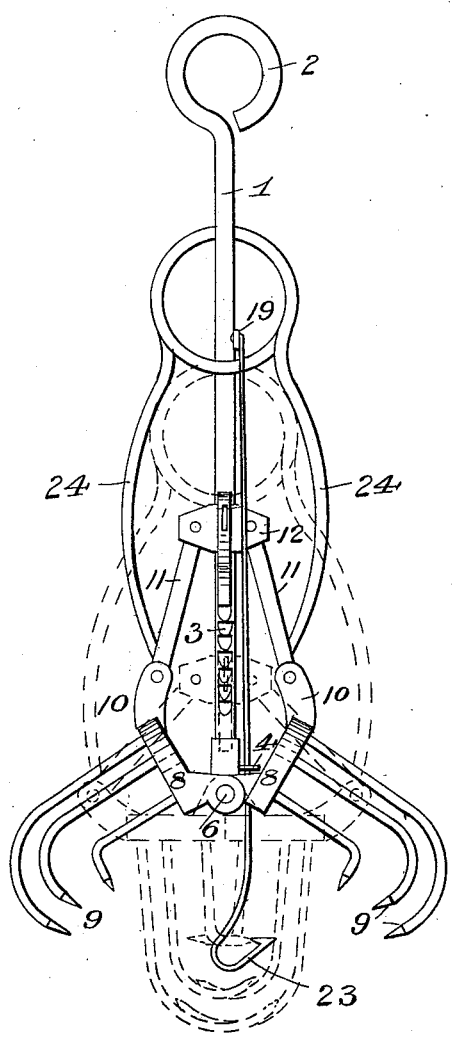
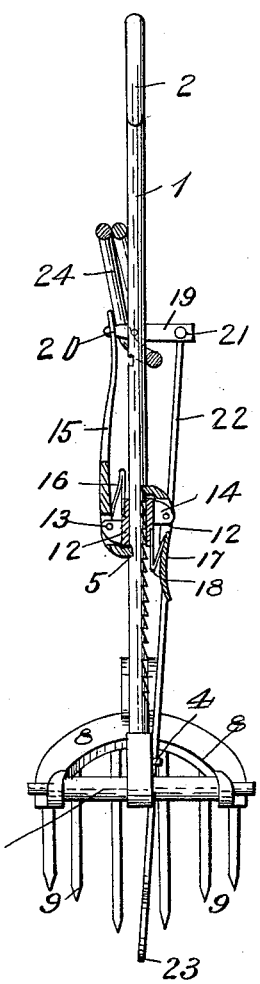
Witnesses
F. L. Ourand
R. E. Rabbitt
Inventor
W. H. McWhirter
By John S. Duffie
Attorney

UNITED STATES PATENT OFFICE.

WILLIAM H. McWHIRTER, OF ALGOMA, MISSISSIPPI.

ANIMAL-TRAP.

SPECIFICATION forming part of Letters Patent No. 596,334, dated December 28, 1897.

Application filed July 8, 1897. Serial No. 643,919. (No model.)

*To all whom it may concern:*

Be it known that I, WILLIAM H. MCWHIRTER, a citizen of the United States, residing at Algoma, in the county of Pontotoc and State of Mississippi, have invented certain new and useful Improvements in Animal-Traps; and I do hereby declare the following to be a full, clear, and exact description of the invention, such as will enable others skilled in the art to which it appertains to make and use the same.

My invention is an animal-trap; and it consists in the novel construction and arrangement of its parts, hereinafter set out in this specification and the claims hereunto attached.

In the accompanying drawings, Figure 1 is a side plan view, the jaws of the trap sprung, the dotted lines showing the jaws closed. Fig. 2 is an edge plan view of my invention with the jaws of the trap sprung.

My invention is described as follows:

1 is a rod having on its upper end an eye 2, and near its lower end said rod has on its front face a series of ratchet-teeth 3, and extending from its edge and almost immediately at its lower end is an eye 4, and on its face opposite the series of ratchet-teeth 3 is a lock-notch 5, and secured in its lower end is an axle 6, and pivoted on each end of the axle are horseshoe-jaws 8, and secured in said horseshoe-jaws 8 are teeth 9, and extending from the outer faces of said jaws 8 are bifurcated arms 10, in which are pivoted the lower ends of arms 11, the upper arms of which are pivoted between the bifurcated ends of a slide 12. This slide has through it a perforation through which the rod 1 works, and on the rear face of the slide is an elevation 13, and on the front face is another elevation 14, and to said elevation 13 is pivoted a dog 15, actuated by a spring 16, and when the trap is sprung, as shown in Figs. 1 and 2, the said spring 16 holds the nose of the dog down in the notch 5, thus keeping it locked until it is thrown. Pivoted to the elevation 14 is another dog 17, the nose of which catches in the ratchet-teeth 3 when the trap has been thrown and thus keeps it from being opened until the lever end of said dog 17 is pressed down. Said dog 17 is actuated by a spring 18.

To the rod 1, some distance above the sliding plate 12, is pivoted a lever 19, having on one end an elbow extension 20 and in the other a perforation 21, and to this perforated end is pivoted the upper end of a bait-rod 22. Said bait-rod passes down through the eye 4 and terminates in a bait-hook 23.

Between the bifurcated arms 10 is also pivoted the spring-arms of an actuating-spring 24, the upper end of which is so coiled as to give great elasticity to said spring and at the same time retain in its coil part the upper end of the rod 1.

The trap is set by pressing the arms 10 together, which operation sends the plate up the rod 1 until the nose of the dog 15 catches in the notch 5. Then the elbow-arm of the lever 19 is placed over the upper end of said dog 15. The bait is placed on the bait-hook 23, and when an animal pulls upon the bait it pulls the rod 22 downward, which motion causes the elbow-arm 20 to pull on the lever end of the dog and throws its nose out of the notch 5, when the spring 24 immediately throws the teeth together with great force and the actuating-spring forces the nose of the dog 17 into one of the notches 3 and thus keeps the jaws from being sprung open.

Having described my invention, what I claim as new, and desire to secure by Letters Patent, is—

1. The combination of the rod 1, having a series of ratchet-teeth 3, on one side, and on the other a notch 5; eye 4, secured to said rod near its lower end; axle 6, secured to the lower end of said rod; horseshoe-jaws 8, provided with teeth 9, and bifurcated extensions 10, pivoted to said axle 6; slide 12; arms 11, secured between the bifurcated ends of extension 10, and of the slide 12; actuating-spring 24, its spring ends pivoted between the bifurcated ends of arms 10; dog 15, pivoted to the rear face of the slide 12, and actuated by a spring 16; dog 17, pivoted to the front face of the slide 12, and actuated by a spring 18; lever 19, pivoted to the rod 1, and having an elbow-arm 20, and perforated end 21; rod 22, having its upper end pivoted to the perforated end of lever 19, its lower end passing through eye 4, and terminating in a bait-hook 23, substantially as shown and described and for the purposes set forth.

2. The combination of the rod 1, having on one side a notch 5; axle 6, secured to the lower end of said rod; jaws 8, provided with teeth 9, and arms 10; slide 12; arms 11, pivoted to arms 10, and slide 12; actuating-spring 24, pivoted to arms 10, and operating-jaws 8; dog 15, adapted to catch in notch 5; spring 16, actuating said dog; lever 19, pivoted to the rod 1, and having an elbow-arm 20; rod 22, pivoted to the end of lever 19, and adapted through said lever to release the dog 15, substantially as shown and described and for the purposes set forth.

In testimony whereof I affix my signature in presence of two witnesses.

WILLIAM H. McWHIRTER.

Witnesses:
WILLIAM T. WARE,
SAML. DUNCAN.